Oct. 14, 1952     G. DOROTHEA     2,614,187

DEVICE FOR PRODUCING TIMED ELECTRICAL IMPULSES

Filed Oct. 23, 1950

GALE DOROTHEA
*INVENTOR.*

BY Edwin B. Cave
ATTORNEY

Patented Oct. 14, 1952

2,614,187

UNITED STATES PATENT OFFICE 2,614,187

DEVICE FOR PRODUCING TIMED ELECTRICAL IMPULSES

Gale Dorothea, Jackson Heights, N. Y.

Application October 23, 1950, Serial No. 191,624

8 Claims. (Cl. 200—90)

This invention relates to devices for producing timed electrical impulses.

An object of the invention is a simple, compact and inexpensive device for producing accurately timed electrical impulses. A further object is a device in which the timing of such impulses can be varied at will over a substantial range by a simple adjustment. Other objects will be apparent from the following description.

In the accompanying drawing.

Figure 1:
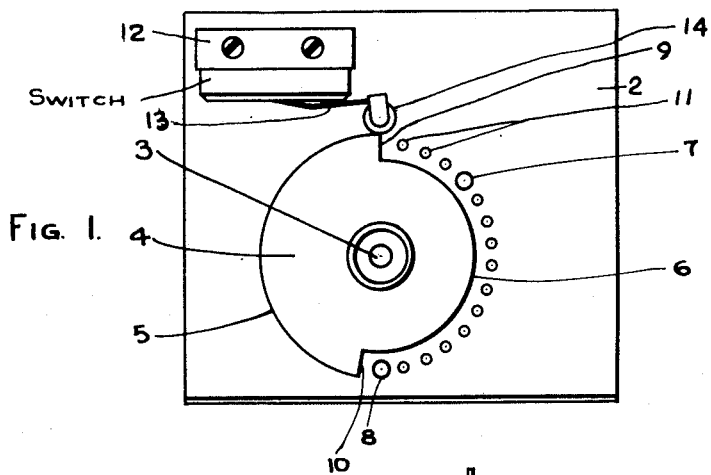
Fig. 1 is a front elevation of one form of a variable timing device constructed in accordance with the present invention.
Figure 2:
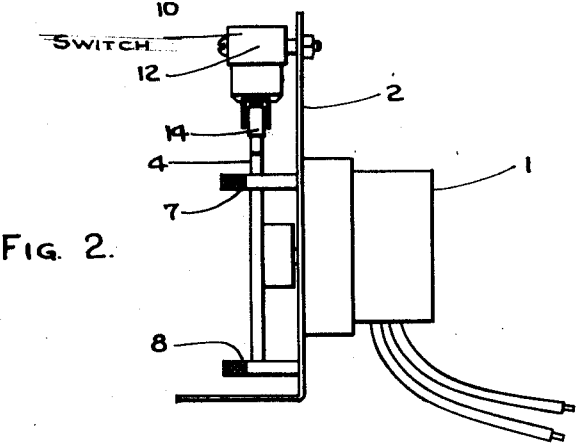
Fig. 2 is a side view of the device of Fig. 1.

In the variable timer shown in Figs. 1 and 2, motive power is supplied by a single phase, alternating current, synchronous clock-type motor 1 mounted upon a supporting wall 2. This motor is of a type similar to that shown, for instance, in U. S. Patent 1,976,880 issued October 16, 1934 to R. C. Graseby and is so constructed that, when an alternating current is applied to it, it is capable of self-starting in either direction depending upon the direction of current flow at the instant of starting. If such a motor is at any time constrained against motion in one direction, it will commence to turn in the opposite direction as soon as the portion of the alternating current cycle is reached in which the current direction is such as to initiate the opposite direction of rotation.

The motor is internally geared to provide the required rate of rotation for the operation of the device. The external shaft 3 of the motor 1 extends through an opening in the wall 2. A cam 4 formed of rigid material is mounted on the end of the shaft 3 on the other side of the wall. The edge of the cam is defined by an essentially circular arc 5 occupying a portion of the periphery and an essentially circular arc 6 of smaller radius occupying the remainder of the periphery. The points 9 and 10 on the periphery, at which the radius changes, serve as abutments or abutment surfaces which are used for stopping the cam rotation as described below.

Two rigid stops 7, 8 are removably mounted on the wall 2 at a distance from the shaft 3 which is greater than the radius of arc 5. These stops serve as abutments and provide abutment surfaces which cooperate with abutments 9 and 10 to restrict the rotation of the cam in either direction since the cam can turn only until the point on its periphery at which it increases in radius reaches one of the stops. Thus, when the cam is rotated in a clockwise direction by the motor 1, it will be brought to a stop as soon as the point 9 on the edge of the cam reaches the stop 7.

When the cam, and with it the rotor of the motor 1, has been stopped, it will remain stationary until the alternating current supplied to the motor reverses in direction, which occurs one half cycle later. After the elapse of one half cycle of the alternating current, the motor will commence to turn in a counter-clockwise direction and will turn the cam in that direction until it is stopped when the point 10 on the edge of the cam reaches the stop 8. When the alternating current has again gone through one half cycle after the rotation of the rotor has been stopped, the rotor will commence to rotate the cam in a clockwise direction. This oscillatory motion of the cam continues as long as alternating current is supplied to the motor.

When the motor is operated on alternating current of constant frequency, the oscillation of the cam will occur with a definite and accurate period. The period of oscillation can be varied in a simple manner by varying the arc through which the cam is permitted to turn.

This is accomplished in the embodiment of the invention shown in the drawing by providing a plurality of mounting holes 11 distributed in an arc about the center of the shaft 3 at a distance from the shaft such that, when the stops 7, 8 are mounted in these holes, their position relative to the cam is such as to permit the action described above.

The holes 11 are internally threaded and the stops 7, 8 are each provided with an externally threaded member capable of being screwed into any one of the holes. By selecting any one of a variety of pairs of holes in which to mount the two stops, any one of a variety of arcs of rotation of the cam, and of a corresponding variety of periods of oscillation, can be obtained.

A single throw electrical switch 12 is also mounted on the wall 2. The switch is actuated by an arm 13 which carries on its free end a roller 14 which rides on the larger diameter arc of cam so long as that arc is in contact with it and drops to a lower position as soon as the point 9 on the edge of the cam moves past it when the cam rotates in a counterclockwise direction. When the cam returns in a clockwise direction, the roller rides up on the cam at the point 9 and remains in its uppermost position. The switch is so positioned that it is closed when the arm is in its upper position and open when the arm is in its lower position. In one complete oscillatory motion of the cam, the switch is opened once and closed once, since the length of the larger diameter arc of the cam is only slightly less than 180 degrees and is such that, even in the most extreme position of the cam, the point 19 of the cam never reaches a position in which the roller 14 can ride down on it to open the switch. It is obvious, however, that the length of the larger diameter arc of the cam can be considerably smaller (or larger), if desired, as for instance as small as 10° or 15°, and that the rotation of the cam can be suitably restricted by proper positioning of the stops so as to prevent the follower 14 from riding down twice in one cycle, if this is to be avoided. It is also obvious that, in special circumstances where a more complex cycle of variable electrical impulses is desired, one or more dips of various lengths may be cut in the larger diameter arc of the cam to provide additional actuations of the switch during the cycle.

It can be seen that not only the period of oscillation of the cam, but also the relative proportion of the time which the switch is open or closed during the period, can be varied by choosing different pairs of holes 11 for mounting the two stops 7, 8.

In the embodiment shown in the drawing, the holes 11 are situated around a circular arc with their centers 12 degrees apart from one another. With the motor 1 so constructed as to turn the cam 4 at a speed of 4 R. P. M., a time of ½ second is required for the cam to pass through the space separating two adjacent holes and a time of 1 second is required for the cam to pass twice through the same space, once clockwise and once counter-clockwise.

Thus, the period of oscillation can be successively increased by 1 second by successively moving the stops 7 and 8 one space together and can be successively decreased by 1 second by successively moving the stops one space apart.

With the stops in any position, the time for which the switch will be open during each cycle is determined by the position of the lower stop 8. This time increases by 1 second intervals as the stop 8 is moved upward through successive holes 11 from the lowest hole to the uppermost hole.

Similarly the time during which the switch is closed varies with the position of the upper stop 7, increasing by 1 second intervals as the stop 7 is moved upward through successive holes 11 from the uppermost hole to the lowest hole.

In place of using two stops as described above, a single stop can be used, serving to determine both the time for which the switch is open and the time for which the switch is closed.

It can thus be seen that the device shown in the drawing provides an extremely flexible, readily variable, accurate timing device. The switch 12 is connected in series with a source of electric current and an electrical device which is to be actuated periodically by the timer, such as an electric lamp, an automatic slide projector, a multi-stop turntable or any display, animation or other device requiring a periodic actuation and a periodic dwell.

It is apparent that the device can be caused to operate at periods other than those described above by using a faster or slower synchronous motor or by gearing the cam 4 to turn at different speeds, and by changing the spacing of the holes 11. The device can be made to operate two electrical loads, alternately actuated, by using a double throw switch in place of a single throw switch.

It is also apparent that in place of stops removably mounted on the wall at fixed intervals, the stops may be constructed so as to be situated in continuously variable positions as by being slidably mounted on a track. In place of using fixed points on the cam cooperating with movable stops on the wall to determine the period of oscillation, fixed points may be provided on the wall which cooperate with movable stops mounted on the cam.

Figure 3:
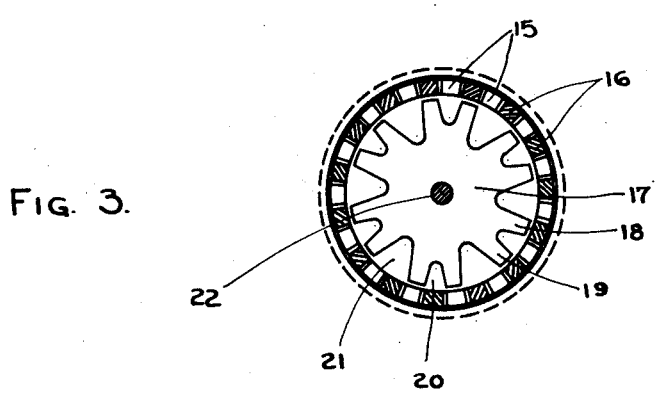
Fig. 3 is a plan view, partly in section, of a portion of a motor of prior art construction used for furnishing the motive power of the device shown in Fig. 1.

As indicated above, a synchronous motor having the characteristics required for the operation of the device of the present invention is shown in U. S. Patent 1,976,880. The construction and operation of a motor of this general type can be understood by reference to Fig. 3, which shows only that part of the motor necessary for an explanation of its operation.

A plurality of salient stator poles 15, which form a part of a body of magnetic material, are disposed, with equal spacing, about a central rotor disc 17 mounted on a shaft 22. An equal number of salient stator poles 16, which form a part of a second body of magnetic material, are also disposed, with equal spacing, about the rotor disc 17 so that they alternate with the stator poles 15.

The body of which the poles 15 form a part and the body of which the poles 16 form a part are magnetically connected by a magnetic path about a portion of which a stator coil is wound. With such a construction, whenever a current is flowing in the stator coil, each of the stator poles 15 has a magnetic polarity opposite to that of the stator poles 16 adjacent to it. When an alternating current is supplied to the stator coil, each stator pole reverses in polarity with the reversals of current in the stator coil.

The rotor is formed of a permanent magnet the poles of which ride from stator pole to stator pole with the reversals of polarity occurring with each alternating current cycle. In a motor as shown, adapted to turn at a speed of 4 R. P. S. (or 240 R. P. M.) when operated on 60 cycle alternating current, the stator is constructed with 30 poles. To cooperate most effectively with a stator with this number of poles, the rotor is formed in the shape of the permanently magnetized disc 17 having three pairs of poles.

Each rotor pole is made up of two sub-poles 18, 19 separated by a recess 20. Each rotor pole is separated by a recess 21 from the adjacent rotor pole. The sub-pole 18 of each pole has a magnetic polarity the same as the sub-pole 19 of the same pole but the complete rotor poles alternate in magnetic polarity around the circumference of the disc. Each complete pole has a width equal to approximately the width of three stator poles plus three times the width of the space between stator poles, or a total of about 36 degrees. Each recess 20 has a width at least equal to that of one stator pole. Each recess 21 has a width equal to that of two stator poles plus twice the width of the space between stator poles, or a total of about 24 degrees. As a result, all of the stator poles which are opposite the sub-poles having the same polarity as one another also have a polarity the same as one another at any instant. Sub-poles of a polarity opposite to one another are situated opposing stator poles opposite to one another in polarity.

Thus each rotor pole is able to ride from one stator pole to the next with the polarity changes of the adjacent stator poles. When there is no current flowing in the stator coil and the stator poles possess no magnetic polarity, the rotor assumes a position in which each rotor pole is as close to a pair of stator poles 15 as to a pair of stator poles 16, since this position provides the most effective magnetic path between the rotor poles of opposite polarity. It can be seen that, as soon as a current is passed through the stator coil so that the poles 15 are given a polarity opposite to that of the poles 16, the rotor sub-poles will move to a position as shown in the drawing in which they are directly opposite the stator poles of opposite polarity and will thereafter ride with the polarity changes of the stator poles. The rotor has a moment of inertia sufficiently small to permit it to start rotating under the initial impulse, which lasts only for the duration of one half cycle of the alternating current, and sufficiently large to keep it rotating with the stator polarity changes.

It can be seen that in the embodiment of the invention described above, the ability of the timing of the electrical impulses to be readily varied results from the use of a mechanical element carrying a pair of abutment surfaces, which element is caused by motor means to undergo mechanical motion through a substantially continuous path until one of these abutment surfaces strikes a cooperating surface of a member mounted on a stationary base, which member acts to cause said motor means to move said mechanical element backward through said path in a reverse direction until the other of the abutment surfaces strikes a second cooperating surface of a member mounted on the stationary base which member is thereby caused to reverse the motor means again and thus repeat the cycle of motion of the said mechanical element. The timing of the electrical impulses is based upon the changes in position of the moving mechanical element.

When the timing is thus based upon a cycle of forward and reverse motion, as opposed for instance to a simple rotary motion in one direction, it is possible to vary the timing of the impulses, without varying the speed of the motor means, by the simple expedient of increasing the travel of the moving mechanical element by changing the spacing of either the moving abutment surfaces or of the cooperating surfaces of the member or members mounted on the stationary base.

The type of motor described in connection with the specific embodiment referred to above is particularly advantageous for use in this type of apparatus because of the ease with which it can be caused to reverse in direction of rotation by simply being stopped and without recourse to more complex switching arrangements. However, in embodiments of a broader aspect of the invention, alternating current or direct current motors may be substituted which are capable of being reversed in direction by a change of field or armature connections.

The moving mechanical element has been described in the specific embodiment above as undergoing a reversible rotary motion. It is apparent that other mechanical motions can be employed.

The invention has been described in terms of its specific embodiments and, since certain modifications and equivalents may be apparent to those skilled in the art, this description is intended to be illustrative of, but not necessarily to constitute a limitation upon, the scope of the invention.

What is claimed is:

1. A device for producing periodically timed electric impulses comprising a base having affixed thereto a synchronous alternating current motor which is capable of self-starting and running in either direction and which, when rotation in one direction is restrained, will start itself rotating in the opposite direction, a cam rotated by said motor, the circumference of said cam being divided into two circular arcs, one of smaller radius than the other, with a relatively abrupt change of radius at the points at which said arcs meet, an electric switch mounted on said base, a follower riding on said cam and actuating said switch, said follower being so positioned that the switch is in one operating position while the follower is riding on the larger radius portion of the cam periphery and is in a different operating position while the follower is riding on the smaller radius portion of the cam periphery, a plurality of holes in said base disposed along an arc of radius intermediate between said larger and smaller radii of said cam periphery, and a pair of stops removably mounted in two of said holes, each of said stops being adapted to engage the cam periphery at said points of abrupt change in diameter to stop the cam rotation in one direction at a time and thus cause the cam and the motor to oscillate through an arc determined by the chosen positions of said stops.

2. A device as described in claim 1 wherein the motor comprises a magnetized rotor having poles of fixed magnetic polarity and a stator having a plurality of poles arranged about said rotor and magnetized by a stator coil in such manner that each stator pole has a magnetic polarity opposite to that of the stator poles immediately adjacent to it.

3. A device for producing periodically timed electric impulses comprising a base having affixed thereto a synchronous alternating current motor which is capable of self starting and running in either direction and which, when rotation in one direction is restrained, will start itself rotating in the opposite direction, a cam rotated by said motor, the circumference of said cam being divided into two circular arcs, one of smaller radius than the other, with a relatively abrupt change of radius at the points at which said arcs meet, an electric switch mounted on said base, a follower riding on said cam and actuating said switch, at least one stop but not more than two stops removably mounted on said base at points at which, at some position of the cam, they engage the cam periphery at said points of abrupt change in diameter to stop the cam rotation in one direction at a time and thus cause the cam and the motor to oscillate through a predetermined arc, and mounting means for mounting said stops in any of a plurality of positions in which they cooperate in said manner with the cam periphery, the timing of the electric impulses deliverable by said switch being dependent upon the choice of positions of said stops.

4. A device for producing periodically timed electric impulses comprising a base having affixed thereto a synchronous alternating current motor which is capable of self starting and running in either direction and which, when rotation in one direction is restrained, will start itself rotating in the opposite direction, a cam rotated by said motor, an electric switch operated by said cam, a pair of abutments on said cam, a cooperating pair of abutments on said base at points at which they are capable of engaging said abutments on said cam to stop the cam rotation in one direction at a time and thus to cause the cam and the motor to oscillate through a predetermined arc, and mounting means for mounting one pair of said two pairs of abutments in any of a plurality of positions, on the member on which it is mounted, in which it cooperates in said manner with said other pair of abutments, the timing of said electric impulses deliverable by said switch being dependent upon the choice of positions of said abutments.

5. A device as described in claim 4 wherein the motor comprises a magnetized rotor having poles of fixed magnetic polarity and a stator having a plurality of poles arranged about said rotor and magnetized by a stator coil in such manner that each stator pole has a magnetic polarity opposite to that of the stator poles immediately adjacent to it.

6. A device for producing periodically timed electric impulses comprising a base having affixed thereto an electric motor capable of rotating in either direction, a cam rotated by said motor having thereon abutment means providing a pair of abutment surfaces, a follower riding on said cam, an electric switch operated by said follower, and means mounted on said base providing two surfaces, one in the path of each of said rotating abutment surfaces, for reversing the direction of rotation of said motor whenever one of said abutment surfaces strikes one of said surfaces provided by said base-mounted means, one of said abutment means and base-mounted means comprising a plurality of holes in the member of which it is a part together with a pair of stops removably mounted in two of said plurality of holes, the timing of said electric impulses delivered by said electric switch being dependent upon the choice of holes in which said pair of stops is mounted.

7. A device for producing periodically timed electric impulses comprising a base having affixed thereto an electric motor capable of running in either direction, a member moved by said motor through a fixed path in a forward direction when the motor runs in one direction and in a reverse direction when the motor runs in the opposite direction, said member having thereon abutment means providing a pair of abutment surfaces, means mounted on said base providing two surfaces, one in the path of each of said moving abutment surfaces, for reversing the direction of rotation of said motor whenever one of said abutment surfaces strikes one of said surfaces provided by said base-mounted means, one of said abutment means and base-mounted means being so constructed that the spacing of the said surfaces provided thereby can be varied, and an electric switch mechanically actuated by said motor.

8. A device for producing periodically timed electric impulses comprising a base having a rotatable member rotatably mounted thereon, an electrical switch so arranged that it is actuated by said rotatable member each time the rotatable member rotates through a predetermined angular position and that the switch is shifted from a first operating position to a second operating position each time said rotatable member passes through said angular position while rotating in one direction and is shifted from said second operating position to said first operating position when said rotatable member passes through said angular position while rotating in the opposite direction, means for rotating said rotatable member back and forth through an arc having one of its limits on each side of said angular position, and limit means capable of fixing, at each of a plurality of positions, the limits of said arc with respect to said angular position, whereby the length of each cycle of operating of said electrical switch can be selected from a plurality of values by selecting the angular size of said arc and whereby the relative times during which said switch is in said first and second positions can be varied by varying the relative fractions of said arc on either side of said angular position.

GALE DOROTHEA.

REFERENCES CITED

The following references are of record in the file of this patent:

UNITED STATES PATENTS

| Number | Name | Date |
| --- | --- | --- |
| 1,745,975 | Bissell | Feb. 4, 1930 |
| 2,105,514 | Welch | Jan. 18, 1938 |
| 2,231,686 | Shaw | Feb. 11, 1941 |